(12) United States Patent
Liu et al.

(10) Patent No.: US 11,891,268 B2
(45) Date of Patent: Feb. 6, 2024

(54) TENSIONING MECHANISM AND METHOD FOR USING TENSIONING MECHANISM

(71) Applicant: CONTEMPORARY AMPEREX TECHNOLOGY CO., LIMITED, Ningde (CN)

(72) Inventors: Jinhui Liu, Ningde (CN); Zhongchao Zhang, Ningde (CN); Cunquan Wu, Ningde (CN); Huan Lu, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/322,783

(22) Filed: May 24, 2023

(65) Prior Publication Data
US 2023/0294956 A1 Sep. 21, 2023

Related U.S. Application Data

(63) Continuation of application No. PCT/CN2022/123483, filed on Sep. 30, 2022.

(30) Foreign Application Priority Data

Oct. 27, 2021 (CN) .......................... 202111253356.2

(51) Int. Cl.
*B65H 75/24* (2006.01)
(52) U.S. Cl.
CPC ................................. *B65H 75/249* (2021.05)
(58) Field of Classification Search
CPC ...... B65H 75/18; B65H 75/24; B65H 75/242; B65H 75/249
See application file for complete search history.

(56) References Cited

U.S. PATENT DOCUMENTS

| | | | | | |
|---|---|---|---|---|---|
| 3,480,225 | A | * | 11/1969 | Alexeff | B65H 75/18 |
| | | | | | 242/598.4 |
| 3,596,846 | A | * | 8/1971 | Johnston | B65H 75/18 |
| | | | | | 242/597.5 |

(Continued)

FOREIGN PATENT DOCUMENTS

| CN | 202609696 U | 12/2012 |
|---|---|---|
| CN | 109250544 A | 1/2019 |

(Continued)

OTHER PUBLICATIONS

The World Intellectual Property Organization (WIPO) International Search Report for PCT/CN2022/123483 dated Dec. 15, 2022 6 pages (including English translation).

*Primary Examiner* — Sang K Kim
(74) *Attorney, Agent, or Firm* — ANOVA LAW GROUP, PLLC (57) ABSTRACT

A tensioning mechanism includes a housing including an accommodation cavity and configured to be sleeved with a to-be-tensioned material, a tensioning assembly mounted in the accommodation cavity, and a driving assembly mounted on the housing and configured to drive the tensioning assembly to move against the housing, so that at least a part of the tensioning assembly protrudes from or retracts into the housing. The driving assembly includes a handle mounted on an outer side of the housing and configured to manually drive the tensioning assembly to move against the housing.

17 Claims, 5 Drawing Sheets

(56) References Cited

U.S. PATENT DOCUMENTS

| | | | |
|---|---|---|---|
| 3,904,143 A | 9/1975 | Kullander | |
| 8,568,046 B2* | 10/2013 | Campbell | B65H 75/24 400/613 |
| 2005/0258301 A1* | 11/2005 | Hirte | B65H 16/04 242/597.6 |

FOREIGN PATENT DOCUMENTS

| | | |
|---|---|---|
| CN | 109850694 A | 6/2019 |
| CN | 112408024 A | 2/2021 |

* cited by examiner

TENSIONING MECHANISM AND METHOD FOR USING TENSIONING MECHANISM

CROSS-REFERENCE TO RELATED APPLICATIONS

This application is a continuation of International Application No. PCT/CN2022/123483, filed on Sep. 30, 2022, which claims priority to Chinese Patent Application No. 202111253356.2, filed on Oct. 27, 2021 and entitled "TENSIONING MECHANISM AND METHOD FOR USING TENSIONING MECHANISM", which are incorporated herein by reference in their entirety.

TECHNICAL FIELD

This application relates to the technical field of mechanical equipment, and in particular, to a tensioning mechanism and a method for using the tensioning mechanism.

BACKGROUND

A tensioning mechanism serves to fix a roll-shaped material to facilitate subsequent processing of the material. The material sleeves a housing of the tensioning mechanism. In order to facilitate the mounting and removal of the material on the tensioning mechanism, an inside diameter of the material is usually greater than an outside diameter of the housing. However, this structure causes the material to wobble on the housing, so that the material is prone to be damaged or dropped to cause safety problems.

SUMMARY

This application provides a tensioning mechanism and a method for using the tensioning mechanism, so as to improve firmness of mounting a material on the tensioning mechanism and improve safety of use of the tensioning mechanism.

This application provides a tensioning mechanism. The tensioning mechanism includes: a first housing, where the first housing includes an accommodation cavity, and the first housing is configured to be sleeved with a to-be-tensioned material; a tensioning assembly, where the tensioning assembly is mounted in the accommodation cavity; and a driving assembly, where the driving assembly is mounted on the first housing, and the driving assembly is configured to drive the tensioning assembly to move against the first housing, so that at least a part of the tensioning assembly protrudes from or retracts into the first housing. The driving assembly includes a handle. The handle is mounted on an outer side of the first housing. The handle is configured to manually drive the tensioning assembly to move against the first housing.

In this application, by virtue of the tensioning assembly, the material is tensioned by the first housing and the tensioning assembly, thereby reducing the risk that a clearance existent between the material and the first housing makes the material movable against the first housing, and increasing firmness of the material mounted on the first housing and improving safety of the tensioning mechanism. The movement of the driving assembly is manually controlled through the handle, thereby reducing the energy consumed by the tensioning mechanism and enabling a user to use the tensioning mechanism handily, and in turn, improving the performance of the tensioning mechanism.

In a possible design, the tensioning assembly includes a pressing piece and a connecting piece. A first end of the connecting piece is connected to the pressing piece. A second end of the connecting piece is connected to the driving assembly. The driving assembly drives, through the connecting piece, the pressing piece to move against the first housing. When the material is put on the tensioning mechanism, the pressing piece protrudes from the first housing by a length greater than a distance between the material and the first housing.

In this application, the movement of the pressing piece is controlled by the connecting piece, thereby simplifying the connection manner between the driving assembly and the pressing piece, reducing the production cost of the tensioning mechanism, and increasing flexibility of mounting positions of the pressing piece and the driving assembly. The length by which the pressing piece protrudes from the first housing is greater than the distance between the material and the first housing, thereby increasing the force exerted by the pressing piece on a sidewall of the material, and further improving the firmness of the material placed on the first housing.

In a possible design, the tensioning assembly further includes a first rotation shaft located in the accommodation cavity. The connecting piece is able to oscillate around the first rotation shaft. The first rotation shaft is located between the first end and the second end, so that the first end and the second end are able to ascend and descend as driven by the driving assembly.

In this application, the connecting piece rotates around the first rotation shaft, thereby reducing the space required for motion of the connecting piece. In addition, the connecting piece, the first rotation shaft, the driving assembly, and the pressing piece form a lever structure, thereby reducing the force required for the driving assembly to drive the pressing piece to move, and facilitating operations of the user.

In a possible design, the tensioning assembly further includes a first stopper. The first stopper is mounted in the accommodation cavity. The first stopper is configured to limit the oscillation angle of the connecting piece.

In this application, the oscillation angle of the connecting piece is limited by the first stopper, thereby reducing the risk that an excessive oscillation angle of the connecting piece leads to interference with other components inside the accommodation cavity and results in damage, increasing safety of the connecting piece, and increasing the lifespan of the connecting piece.

In a possible design, the first stopper is equipped with a limiting hole that extends along a height direction of the tensioning mechanism, and the connecting piece extends into the limiting hole.

In this application, the oscillation angle of the connecting piece is limited by the limiting hole, thereby simplifying the structure of the first stopper. In addition, the connection manner between the first stopper and the connecting piece is simplified, thereby reducing the occupied space in the accommodation cavity after the first stopper is connected to the connecting piece, and further downsizing the first housing.

In a possible design, the tensioning assembly further includes an elastomer. One end of the elastomer is connected to the first housing. Another end of the elastomer is connected to the pressing piece. The elastomer is configured to drive the pressing piece to reset.

In this application, the elastomer enables the pressing piece to automatically protrude from or retract into the first housing, thereby simplifying the user's operation and improving the user experience.

In a possible design, the tensioning assembly further includes a first fastener. The pressing piece is connected to a movable piece. The movable piece is at least partly located in the first fastener and is able to move against the first fastener along a height direction of the tensioning mechanism, so as to limit a distance by which the pressing piece moves against the first housing.

In this application, the first fastener can serve a function of guiding, thereby reducing the risk of wobbling during motion of the movable piece, and increasing stability of the movable piece in motion. The first fastener restricts the movement distance of the pressing piece through the movable piece, thereby reducing the risk of damage to the connecting piece caused by an excessive movement distance of the pressing piece, and in turn, increasing the lifespan of the connecting piece 22 and the lifespan of the tensioning mechanism.

In a possible design, the driving assembly includes a plunger rod. One end of the plunger rod is connected to the handle. The other end of the plunger rod is connected to the second end of the connecting piece. The handle drives, through the plunger rod, the connecting piece to rotate.

In this application, the plunger rod controls the oscillation of the connecting piece, thereby simplifying the connection manner between the driving assembly and the connecting piece. In addition, the plunger rod increases the distance between the driving assembly and the connecting piece, thereby increasing flexibility of the mounting positions of the driving assembly and the connecting piece.

In a possible design, the handle is able to rotate against the first housing. The driving assembly further includes a cam. The cam is fixedly connected to the handle. One end of the plunger rod is connected to the handle through the cam. The handle is able to drive the cam to rotate around a second rotation shaft, so as to drive the plunger rod to ascend or descend against the first housing.

In this application, by virtue of the cam, the rotation of the handle and the cam is transformed into the movement of the plunger rod, thereby simplifying the connection manner between the handle and the plunger rod, and reducing production cost of the driving assembly.

In a possible design, the driving assembly further includes a second housing. The handle and the cam are mounted in an inner cavity of the second housing through the second rotation shaft. A limiting portion is disposed on a sidewall of the second housing. A limiting fit portion is disposed on the handle or the cam. When the handle and the cam rotate against the second housing, the limiting portion is able to abut on the limiting fit portion to limit a rotation angle of the handle and the cam.

In this application, the rotation angle of the handle and the cam is limited by the limiting portion and the limiting fit portion, thereby reducing the risk of inconvenient operation caused by an unduly large rotation angle, and in turn, improving user experience.

In a possible design, the driving assembly further includes a fixing sleeve. The plunger rod is at least partly located in the fixing sleeve and is able to slide against the fixing sleeve. One end of the fixing sleeve extends into the inner cavity of the second housing and abuts on the second housing. Another end of the fixing sleeve extends into the accommodation cavity of the first housing. The driving assembly is mounted on the first housing through the fixing sleeve.

In this application, the fixing sleeve serves a function of position limiting and guiding, thereby reducing the risk of the plunger rod detaching from the connecting piece due to wobbling, and increasing motion stability of the plunger rod. In addition, the fixing sleeve can protect the plunger rod, thereby reducing the risk of fracture of the plunger rod in motion caused by an excessive length, thereby increasing the lifespan of the plunger rod.

In a possible design, the tensioning mechanism includes a second stopper. The second stopper is mounted on the first housing. The second stopper at least partly protrudes out of the first housing so as to restrict the material from detaching from the first housing.

In this application, the second stopper limits the motion of the material along the length direction of the first housing, thereby reducing safety hazards caused by the detachment of the material from the first housing, and further improving the safety of the tensioning mechanism.

In a possible design, the second stopper is able to rotate around a third rotation shaft against the first housing, so that the second stopper protrudes out of the first housing or retracts into the accommodation cavity of the first housing.

In this application, the second stopper can rotate around the third rotation shaft, thereby facilitating the mounting and removal of the material, reducing the risk of damaging the material and the second stopper during the mounting or removal of the material, increasing the lifespan of the second stopper, improving the production quality of the material, and improving the performance of the tensioning mechanism.

In a possible design, the tensioning mechanism further includes a magnetic piece. The magnetic piece is mounted in the accommodation cavity. The second stopper is equipped with a magnetic fit piece or the second stopper is made of a metal. When the second stopper at least partly protrudes out of the first housing, the magnetic piece is able to fit the magnetic fit piece or the second stopper to limit rotation of the second stopper against the first housing.

In this application, the magnetic piece can reduce the risk that the material is detached from the first housing when the second stopper rotates around the third rotation shaft and retracts into the accommodation cavity, thereby increasing the working stability of the second stopper.

In a possible design, the tensioning mechanism includes a bearing. The bearing is mounted on the first housing through a mounting base. The bearing at least partly protrudes out of the first housing.

In this application, the bearing reduces the friction between the material and the first housing during the mounting and removal of the material, thereby facilitating the mounting and removal of the material and improving user experience.

In a possible design, along a length direction of the tensioning mechanism, the tensioning mechanism includes a first mounting block and a second mounting block disposed opposite to each other. Both the first mounting block and the second mounting block are fixedly connected to the first housing. The mounting base is mounted on the first housing through the first mounting block and the second mounting block.

In this application, the mounting base is fixedly connected to the first mounting block through the third mounting block, and is fixedly connected to the first housing through the first mounting block and the second mounting block, thereby simplifying the connection manner between the mounting base and the housing.

This application further provides a method for using a tensioning mechanism. The tensioning mechanism is any one of the tensioning mechanisms described above. The tensioning mechanism further includes a pressing piece. The method for using the tensioning mechanism includes: S2: driving the handle to rotate against the first housing, so that the pressing piece at least partly retracts into an interior of the accommodation cavity; S3: sleeving the first housing with a roll-shaped material; and S4: driving the handle to rotate against the first housing, so that at least a part of the pressing piece protrudes out of the first housing and abuts on the material, so as to limit motion of the material against the tensioning mechanism.

In this application, through a handle, the pressing piece is driven to retract into the accommodation cavity. After the first housing is sleeved with the material, the pressing piece is driven through the handle to protrude from the first housing and abut on the material, so that the material is tensioned by the first housing and the pressing piece, thereby reducing the safety hazards caused by the motion of the material against the housing, increasing the firmness of the material mounted on the first housing, and improving the safety of the tensioning mechanism. When the pressing piece is driven through the handle to protrude from or retract into the first housing, no motor is required for driving, thereby reducing energy consumption and enabling the user to use the tensioning mechanism handily.

In a possible design, the tensioning mechanism further includes a second stopper. The method for using a tensioning mechanism further includes: S1: driving the second stopper to rotate against the first housing, so that the second stopper retracts into the accommodation cavity of the first housing; and S5: driving the second stopper to rotate against the first housing, so that at least a part of the second stopper protrudes from the first housing to restrict the material from detaching from the first housing.

In this application, the second stopper is disposed to make the material abut on the second stopper, thereby reducing the risk of detachment of the material from the first housing, and further improving the safety of the tensioning mechanism.

Understandably, the above general description and the following detailed description are merely illustrative without limiting this application.

The drawings are not necessarily drawn to scale.

REFERENCE NUMERALS

1—first housing;
   11—accommodation cavity;
      111—third rotation shaft;
      112—magnetic piece;
   12—first mounting block;
   13—second mounting block;
   14—third mounting block;
   15—stop block;
2—tensioning assembly;
   21—pressing piece;
   22—connecting piece;
      221—first end;
      222—second end;
   23—first rotation shaft;
   24—first stopper;
      241—limiting hole;
   25—elastomer;
   26—first fastener;
   27—movable piece;
   28—fixing base;
3—driving assembly;
   31—handle;
      311—Limiting fit portion;
   32—plunger rod;
   33—cam;
   34—second housing;
      341—limiting portion;
   35—fixing sleeve;
   36—second rotation shaft;
4—second stopper;
5—bearing;
6—mounting base;
7—end cap.

DETAILED DESCRIPTION OF EMBODIMENTS

Some embodiments of the technical solutions of this application are described in detail below with reference to the drawings. The following embodiments are merely intended as examples to describe the technical solutions of this application more clearly, but not intended to limit the protection scope of this application.

Unless otherwise defined, all technical and scientific terms used herein bear the same meanings as what is normally understood by a person skilled in the technical field of this application. The terms used herein are merely intended to describe specific embodiments but not to limit this application. The terms "include" and "contain" and any variations thereof used in the specification, claims, and brief description of drawings of this application are intended as non-exclusive inclusion.

In the description of the embodiments of this application, the technical terms "first" and "second" are merely intended to distinguish between different items but not intended to indicate or imply relative importance or implicitly specify the number of the indicated technical features, specific order, or order of precedence. In the description of the embodiments of this application, unless otherwise expressly specified, "a plurality of" means two or more.

Reference to an "embodiment" herein means that a specific feature, structure or characteristic described with reference to this embodiment may be included in at least one embodiment of this application. Reference to this term in different places in the specification does not necessarily represent the same embodiment, nor does it represent an independent or alternative embodiment in a mutually exclusive relationship with other embodiments. A person skilled in the art explicitly and implicitly understands that the embodiments described herein may be combined with other embodiments.

In the description of embodiments of this application, the term "and/or" merely indicates a relationship between related items, and represents three possible relationships. For example, "A and/or B" may represent the following three circumstances: A alone, both A and B, and B alone. In addition, the character "/" herein generally indicates an "or" relationship between the item preceding the character and the item following the character.

In the description of embodiments of this application, the term "a plurality of" means two or more (including two). Similarly, "a plurality of groups" means two or more groups (including two groups), and "a plurality of pieces" means two or more pieces (including two pieces).

In the description of embodiments of this application, a direction or a positional relationship indicated by the terms such as "center", "longitudinal", "transverse", "length", "width", "thickness", "up", "down", "before", "after", "left", "right", "vertical", "horizontal", "top", "bottom", "in", "out", "clockwise", "counterclockwise", "axial", "radial", and "circumferential" is a direction or positional relationship based on the illustration in the drawings, and is merely intended for ease or brevity of description of embodiments of this application, but not intended to indicate or imply that the indicated device or component is necessarily located in the specified direction or constructed or operated in the specified direction. Therefore, such terms are not to be understood as a limitation on embodiments of this application.

In the description of the embodiments of this application, unless otherwise expressly specified and defined, the technical terms such as "mounting", "concatenation", "connection", and "fixing" need to be understood in a broad sense, for example, understood as a fixed connection or a detachable connection or integrally formed; or understood as a mechanical connection or an electrical connection; understood as a direct connection, or an indirect connection implemented through an intermediary; or understood as internal communication between two components or interaction between two components. A person of ordinary skill in the art can understand the specific meanings of the terms in the embodiments of this application according to specific situations.

A tensioning mechanism serves to fix a roll-shaped material to facilitate subsequent processing of the material. A housing of the tensioning mechanism is sleeved with the material. In order to make it convenient to mount and remove the material on the tensioning mechanism, an inside diameter of the material is usually greater than an outside diameter of the housing. However, this structure causes the material to wobble on the housing, so that the material is prone to be damaged or dropped to cause safety problems.

To solve the above problems, the tensioning mechanism includes a housing and a tensioning piece. The housing is sleeved with a roll-shaped material. The tensioning piece is configured to fill the clearance between the roll-shaped material and the housing. In this way, the inner wall of the roll-shaped material is tensioned by the housing and the tensioning piece, and the roll-shaped material is fixed onto the housing. To make it convenient to mount and remove the material on the housing, the tensioning piece can protrude from or retract into the housing. Generally, the tensioning mechanism works in conjunction with a motor to control the motion of the tensioning piece. However, when the tensioning mechanism is not energized, the tensioning piece is unable to protrude from or retract into the housing, and makes the tensioning mechanism unable to work normally. In addition, the motion of the tensioning piece is controlled by the motor, thereby increasing the energy consumption of the tensioning mechanism.

To facilitate a user to use the tensioning mechanism handily and reduce the energy consumption of the tensioning mechanism, an embodiment of this application provides a tensioning mechanism that can be manually driven. Specifically, a handle is disposed in the tensioning mechanism. Through the handle, the user can manually drive the tensioning mechanism to work to tension the material, so as to make the tensioning mechanism handily available and reduce energy consumption.

The tensioning mechanism disclosed in an embodiment of this application is applicable to tensioning a roll-shaped material such as a roll-shaped electrode plate and paper rolls.

As shown in FIG. 1 to FIG. 4, the tensioning mechanism includes: a first housing 1 that includes an accommodation cavity 11 and that is configured to be sleeved with a to-be-tensioned material; a tensioning assembly 2 mounted in the accommodation cavity 11; and a driving assembly 3 mounted on the first housing 1. The driving assembly 3 is configured to drive the tensioning assembly 2 to move against the first housing 1, so that at least a part of the tensioning assembly 2 protrudes from or retracts into the first housing 1. The driving assembly 3 includes a handle 31. The handle 31 is mounted on an outer side of the first housing 1. The handle 31 is configured to manually drive the tensioning assembly 2 to move against the first housing 1.

In this embodiment, after the first housing 1 is sleeved with the roll-shaped material, the user can drive, by using the handle 31 of the driving assembly 3, the tensioning assembly 2 to move against the first housing 1. In this way, at least a part of the tensioning assembly 2 protrudes from the first housing 1 and abuts on an inner surface of the material. In this case, the material is tensioned by the first housing 1 and the tensioning assembly 2.

Therefore, by virtue of the tensioning assembly 2, the material is tensioned by the first housing 1 and the tensioning assembly 2, thereby reducing the risk that a clearance existent between the material and the first housing 1 makes the material movable against the first housing 1, and increasing firmness of the material mounted on the first housing 1 and improving safety of the tensioning mechanism. The movement of the driving assembly 3 is manually controlled through the handle 31, thereby reducing the energy consumed by the tensioning mechanism and enabling a user to use the tensioning mechanism handily, and in turn, improving the performance of the tensioning mechanism.

Figure 1:
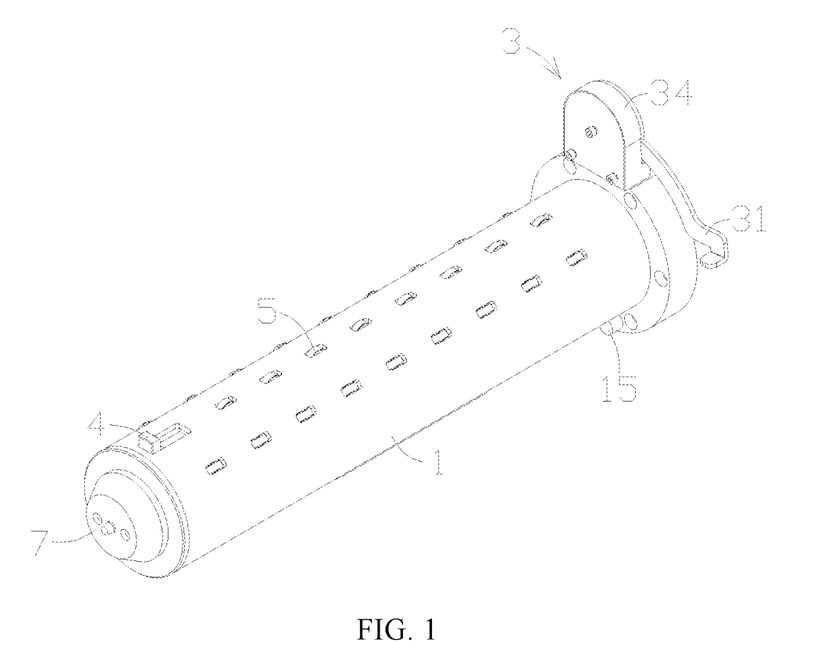
FIG. 1 is a schematic structural diagram of a tensioning mechanism according to a specific embodiment of this application.
Figure 2:
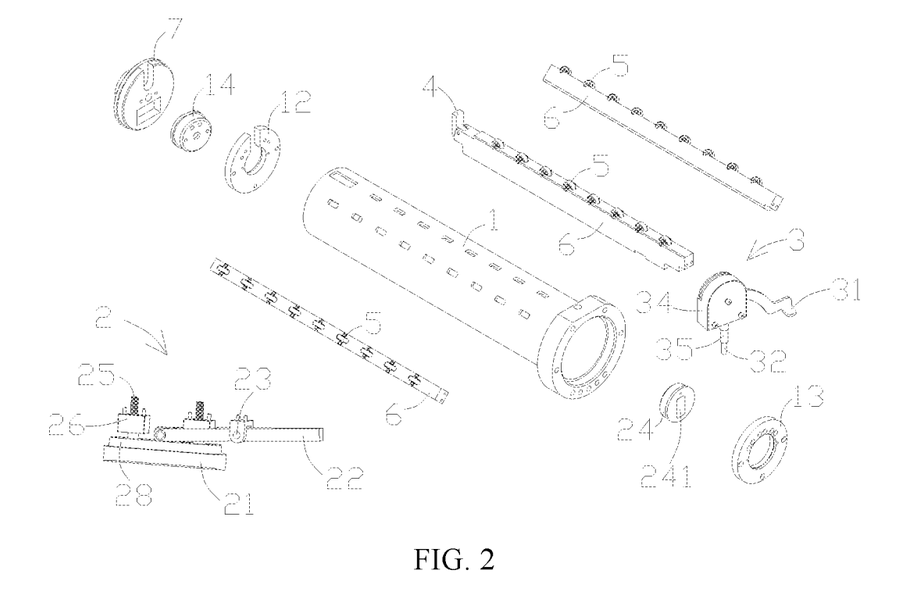
FIG. 2 is an exploded view of FIG. 1.
Figure 3:
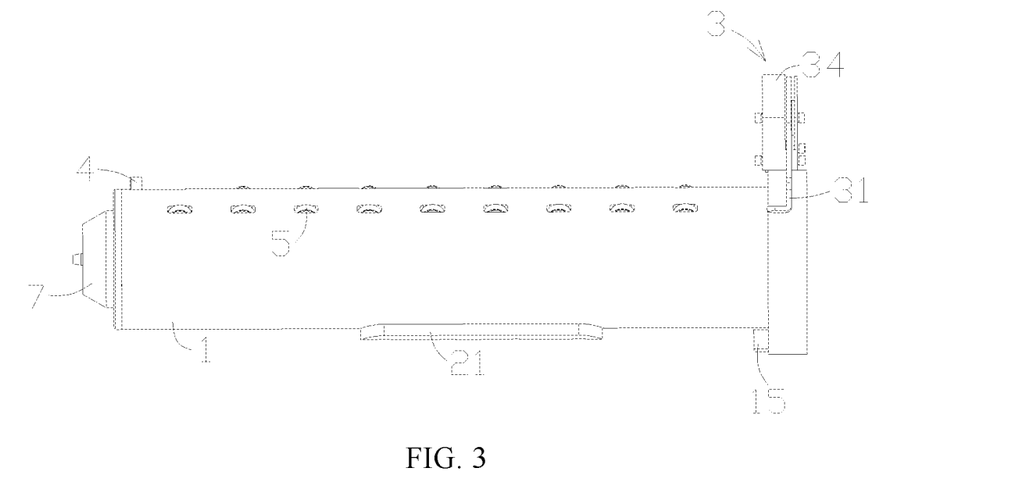
FIG. 3 is a schematic structural diagram of FIG. 1 as viewed from another viewing angle.
Figure 4:
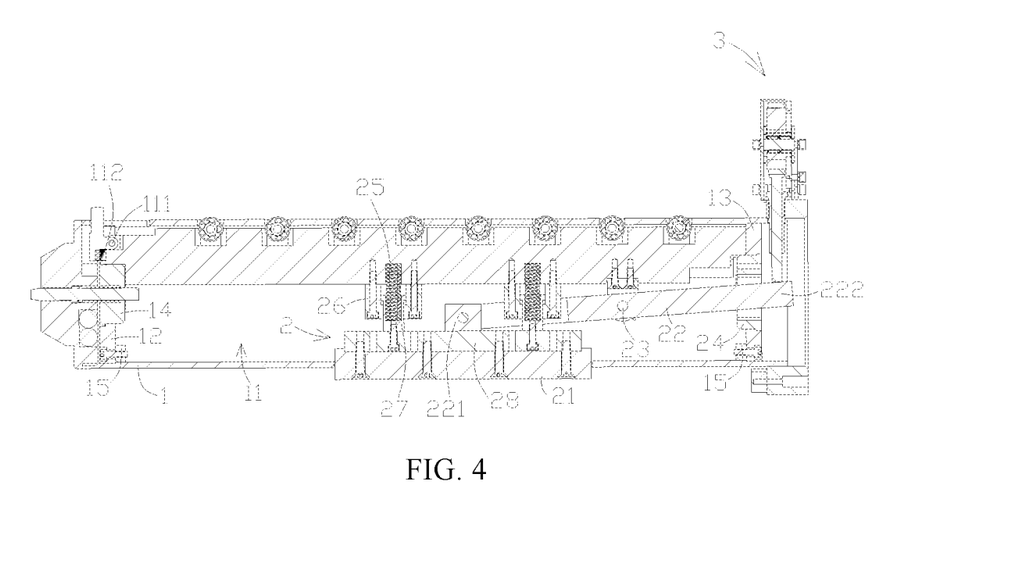
FIG. 4 is a sectional view of FIG. 3.
Figure 5:
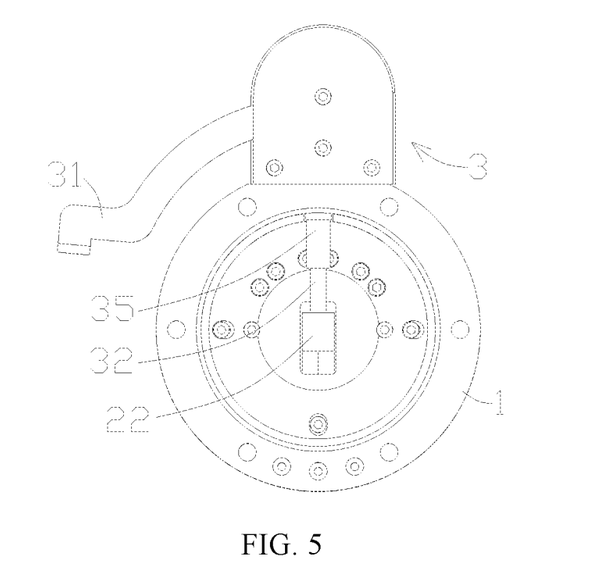
FIG. 5 is a schematic structural diagram of FIG. 3 as viewed from another viewing angle.
Figure 6:
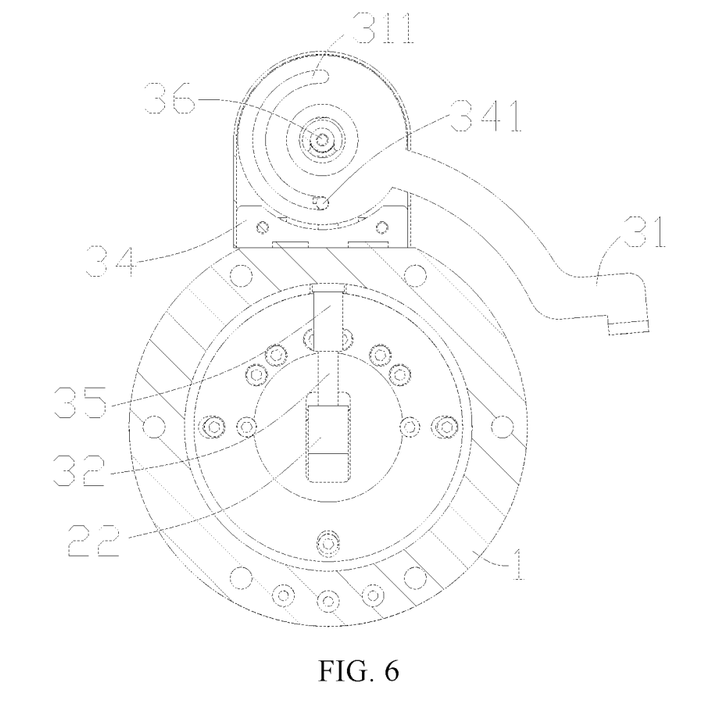
FIG. 6 is a sectional view of FIG. 5 on a first plane.
Figure 7:
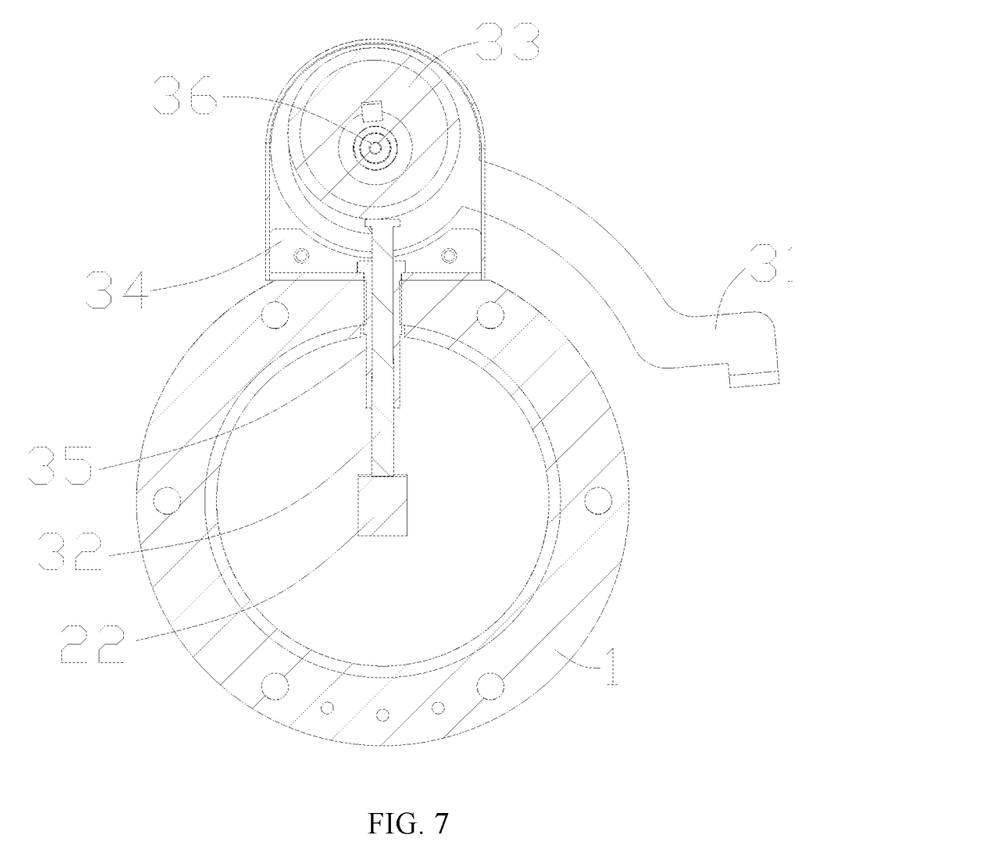
FIG. 7 is a sectional view of FIG. 6 on a second plane.

Specifically, as shown in FIG. 2 and FIG. 4, the tensioning assembly 2 includes a pressing piece 21 and a connecting piece 22. A first end 221 of the connecting piece 22 is connected to the pressing piece 21. A second end 222 of the connecting piece 22 is connected to the driving assembly 3. The driving assembly 3 drives, through the connecting piece 22, the pressing piece 21 to move against the first housing 1. When the material is put on the tensioning mechanism, the pressing piece 21 protrudes from the first housing 1 by a length greater than a distance between the material and the first housing 1.

In this embodiment, the two ends of the connecting piece 22 are connected to the pressing piece 21 and the driving assembly 3 respectively. The driving assembly 3 drives, through the connecting piece 22, the pressing piece 21 to move against the first housing 1. In this way, at least a part of the pressing piece 21 protrudes from the first housing 1 and abuts on the inner surface of the material to limit the motion of the material against the first housing 1.

With the connecting piece 22 controlling the motion of the pressing piece 21, the connection manner between the driving assembly 3 and the pressing piece 21 is simplified, thereby reducing the number of parts required for implementing connection between the driving assembly 3 and the pressing piece 21, and reducing production cost of the tensioning mechanism. The two ends of the connecting piece 22 are connected to the pressing piece 21 and the driving assembly 3 respectively. By changing the length of the connecting piece 22, the distance between the pressing piece 21 and the driving assembly 3 can be changed, thereby increasing flexibility of the mounting positions of the pressing piece 21 and the driving assembly 3. The length by which the pressing piece 21 protrudes from the first housing 1 is greater than the distance between the material and the first housing 1, thereby increasing the force exerted by the pressing piece 21 on a sidewall of the material, and in turn, increasing the friction between the pressing piece 21 and the material, and further improving the firmness of the material placed on the first housing 1.

More specifically, as shown in FIG. 2 and FIG. 4, the tensioning assembly 2 further includes a first rotation shaft 23 located in the accommodation cavity 11. The connecting piece 22 is able to oscillate around the first rotation shaft 23. The first rotation shaft 23 is located between the first end 221 and the second end 222, so that the first end 221 and the second end 222 are able to ascend and descend as driven by the driving assembly 3.

In this embodiment, the first rotation shaft 23 is disposed between the first end 221 and the second end 222 of the connecting piece 22. The first rotation shaft 23 can limit the movement of the connecting piece 22 against the first housing 1 along the height direction of the tensioning mechanism. When the driving assembly 3 drives the connecting piece 22 to move, due to existence of the first rotation shaft 23, the connecting piece 22 oscillates around the first rotation shaft 23. In this case, the connecting piece 22, the first rotation shaft 23, the driving assembly 3, and the pressing piece 21 form a lever structure. The driving assembly 3 controls the connecting piece 22 to oscillate around the first rotation shaft 23. In this way, the first end 221 of the connecting piece 22 ascends or descends, and the second end 222 descends or ascends, thereby controlling the pressing piece 21 to protrude from or retract into the first housing 1.

Therefore, with the first rotation shaft 23 disposed, the connecting piece 22 can rotate around the first rotation shaft 23, thereby reducing the space required for motion of the connecting piece 22, thereby saving the space of the accommodation cavity 11, and in turn, downsizing the first housing 1 and reducing the production cost of the tensioning mechanism. In addition, the connecting piece 22, the first rotation shaft 23, the driving assembly 3, and the pressing piece 21 form a lever structure, thereby reducing the force required for the driving assembly 3 to drive the pressing piece 21 to move, facilitating operations of the user, and improving user experience.

More specifically, as shown in FIG. 2 and FIG. 4, the tensioning assembly 2 further includes a first stopper 24. The first stopper 24 is mounted in the accommodation cavity 11. The first stopper 24 is configured to limit the oscillation angle of the connecting piece 22.

In this application, the oscillation angle of the connecting piece 22 is limited by the first stopper 24, thereby reducing the risk that an excessive oscillation angle of the connecting piece 22 leads to interference with other components inside the accommodation cavity 11 and results in damage, increasing safety of the connecting piece 22, and increasing the lifespan of the connecting piece 22.

More specifically, as shown in FIG. 2, the first stopper 24 is equipped with a limiting hole 241 that extends along a height direction of the tensioning mechanism, and the connecting piece 22 extends into the limiting hole 241.

In this embodiment, the connecting piece 22 can abut on a top wall or bottom wall of the limiting hole 241 to limit the oscillation angle of the connecting piece 22.

The limiting hole 241 simplifies the structure of the first stopper 24, and reduces production cost of the first stopper 24. In addition, the connection manner between the first stopper 24 and the connecting piece 22 is simplified, thereby reducing the number of parts required for implementing connection between the first stopper 24 and the connecting piece 22, and in turn, reducing the occupied space in the accommodation cavity 11 after the first stopper 24 is connected to the connecting piece 22, and further downsizing the first housing 1.

Specifically, as shown in FIG. 2 and FIG. 4, the tensioning assembly 2 further includes an elastomer 25. One end of the elastomer 25 is connected to the first housing 1. Another end of the elastomer 25 is connected to the pressing piece 21. The elastomer 25 is configured to drive the pressing piece 21 to reset.

In an embodiment, along the height direction of the tensioning mechanism, when the oscillation of the connecting piece 22 around the first rotation shaft 23 causes the first end 221 to move upward and causes the second end 222 to move downward, the pressing piece 21 retracts into the accommodation cavity 11 as driven by the connecting piece 22. In this case, the spring is in a compressed state and produces a resilience force. When the driving assembly 3 cancels the force exerted on the connecting piece 22, the pressing piece 21 protrudes from the first housing 1 under the action of the resilience force of the elastomer 25. In this case, the first end 221 of the connecting piece 22 moves downward, and the second end 222 moves upward.

In another embodiment, along the height direction of the tensioning mechanism, when the oscillation of the connecting piece 22 around the first rotation shaft 23 causes the first end 221 to move downward and causes the second end 222 to move upward, the pressing piece 21 protrudes from the first housing 1 as driven by the connecting piece 22. In this case, the spring is in a stretched state and produces a resilience force. When the driving assembly 3 cancels the force exerted on the connecting piece 22, the pressing piece 21 retracts into the accommodation cavity 11 under the action of the resilience force of the elastomer 25. In this case, the first end 221 of the connecting piece 22 moves upward, and the second end 222 moves downward.

Therefore, the elastomer 25 enables the pressing piece 21 to automatically protrude from or retract into the first housing 1, thereby simplifying the user's operation and improving the user experience.

More specifically, as shown in FIG. 2 and FIG. 4, the tensioning assembly 2 further includes a first fastener 26. The pressing piece 21 is connected to a movable piece 27. The movable piece 27 is at least partly located in the first fastener 26 and is able to move against the first fastener 26 along the height direction of the tensioning mechanism, so as to limit the distance by which the pressing piece 21 moves against the first housing 1.

In this embodiment, one end of the movable piece 27 is connected to the pressing piece 21. The pressing piece 21 can drive the movable piece 27 to move against the first housing 1 along the height direction of the tensioning mechanism. At least a part of the movable piece 27 is located inside the first fastener 26. The movable piece 27 can abut on the bottom wall of the first fastener 26, so as to limit the movement distance of the movable piece 27 against the first fastener 26, and in turn, limit the distance by which the pressing piece 21 moves against the first housing 1.

Therefore, the movable piece 27 can move inside the first fastener 26. The first fastener 26 can serve a function of guiding, thereby reducing the risk of wobbling during motion of the movable piece 27, and increasing stability of the movable piece 27 in motion. The first fastener 26 restricts the movement distance of the pressing piece 21 through the movable piece 27, thereby reducing the risk of damage to the connecting piece 22 caused by an excessive movement distance of the pressing piece 21, and in turn, increasing the lifespan of the connecting piece 22 and the lifespan of the tensioning mechanism.

Specifically, as shown in FIG. 2 and FIG. 4 to FIG. 7, the driving assembly 3 includes a plunger rod 32. One end of the plunger rod 32 is connected to the handle 31. The other end of the plunger rod 32 is connected to the second end 222 of the connecting piece 22. The handle 31 drives, through the plunger rod 32, the connecting piece 22 to rotate.

In this embodiment, the user drives, through the handle 31, the plunger rod 32 to move along the height direction of the tensioning mechanism. One end of the plunger rod 32 is connected to the second end 222 of the connecting piece 22. In this way, the second end 222 of the connecting piece 22 ascends or descends as driven by the plunger rod 32, so that the pressing piece 21 retracts into or protrudes from the first housing 1.

Therefore, the plunger rod 32 controls the oscillation of the connecting piece 22, thereby simplifying the connection manner between the driving assembly 3 and the connecting piece 22, and reducing the production cost of the tensioning mechanism. In addition, the plunger rod 32 increases the distance between the driving assembly 3 and the connecting piece 22, thereby increasing flexibility of the mounting positions of the driving assembly 3 and the connecting piece 22.

More specifically, as shown in FIG. 2 and FIG. 4 to FIG. 7, the handle 31 is able to rotate against the first housing 1. The driving assembly 3 further includes a cam 33. The cam 33 is fixedly connected to the handle 31. One end of the plunger rod 32 is connected to the handle 31 through the cam 33. The handle 31 is able to drive the cam 33 to rotate around a second rotation shaft 36, so as to drive the plunger rod 32 to ascend or descend against the first housing 1. Along the length direction of the plunger rod 32, the width of the plunger rod 32 at an end close to the cam 33 is greater than the width of the plunger rod 32 at an end away from the cam 33.

In this embodiment, the end of the plunger rod 32, which abuts on the cam 33, is a third end; and the end connected to the connecting piece 22 is a fourth end. The distance between an outer contour of the cam 33 and the second rotation shaft 36 remains unchanged, and therefore, during the rotation of the cam 33 around the second rotation shaft 36, the distance between the third end and the second rotation shaft 36 keeps changing. In this way, the plunger rod 32 moves up and down along the height direction of the tensioning mechanism as driven by the cam 33. The handle 31 is fixedly connected to the cam 33. The handle 31 can drive the cam 33 to rotate around the second rotation shaft 36, so as to drive the plunger rod 32 to move up and down, and in turn, drive the pressing piece 21 to retract into or protrude from the first housing 1. The cam 33 may be elliptical, or the cam 33 may be circular. When the cam 33 is circular, the position of the second rotation shaft 36 on the cam 33 deviates from the center of circle of the cam 33.

Therefore, by virtue of the cam 33, the rotation of the handle 31 and the cam 33 is transformed into the movement of the plunger rod 32, thereby simplifying the connection manner between the handle 31 and the plunger rod 32, simplifying the structure of the driving assembly 3, and in turn, reducing the production cost of the driving assembly 3. The handle 31 is fixedly connected to the cam 33, thereby reducing the risk of relative rotation between the handle 31 and the cam 33, thereby increasing the stability of the driving assembly 3 in operation. The width of the third end of the plunger rod 32 is greater than the width of the fourth end, thereby increasing the contact area between the plunger rod 32 and the cam 33, reducing the risk of fracture of the plunger rod 32 caused by a lateral force exerted by the cam 33 on the plunger rod 32 due to a deficient contact area between the plunger rod 32 and the cam 33, and in turn, increasing the lifespan of the plunger rod 32.

More specifically, as shown in FIG. 2 and FIG. 4 to FIG. 7, the driving assembly 3 further includes a second housing 34. The handle 31 and the cam 33 are mounted in an inner cavity of the second housing 34 through the second rotation shaft 36. A limiting portion 341 is disposed on a sidewall of the second housing 34. A limiting fit portion 311 is disposed on the handle 31 or the cam 33. When the handle 31 and the cam 33 rotate against the second housing 34, the limiting portion 341 is able to abut on the limiting fit portion 311 to limit a rotation angle of the handle 31 and the cam 33.

In this embodiment, when the handle 31 and the cam 33 rotate around the second rotation shaft 36, the limiting portion 341 can abut on the limiting fit portion 311 to limit the rotation angle of the handle 31 and the cam 33. The limiting portion 341 may be integrated with the second housing 34 to form one piece, or may be fixedly connected to the second housing 34. The limiting fit portion 311 may be disposed on the handle 31, or disposed on the cam 33. In this embodiment, the limiting fit portion 311 is disposed on the handle 31.

The handle 31 and the cam 33 are disposed in the inner cavity of the second housing 34, thereby reducing the risk of damage to the handle 31 and the cam 33 caused by external interference, and increasing the lifespan and working stability of the handle 31 and the cam 33. The rotation angle of the handle 31 and the cam 33 is limited by the limiting portion 341 and the limiting fit portion 311, thereby reducing the risk of inconvenient operation caused by an unduly large rotation angle, and in turn, improving user experience. The limiting portion 341 is disposed on the second housing 34, and the limiting fit portion 311 is disposed on the handle 31, thereby reducing the risk of complexity of the structure of the limiting fit portion 311 caused by the mounting of the limiting fit portion 311 on the cam 33, simplifying the structure of the limiting fit portion 311, increasing the strength of the limiting fit portion 311, and reducing the production cost of the limiting fit portion 311.

More specifically, as shown in FIG. 2 and FIG. 4 to FIG. 7, the driving assembly 3 further includes a fixing sleeve 35. The plunger rod 32 is at least partly located in the fixing sleeve and is able to slide against the fixing sleeve 35. One end of the fixing sleeve 35 extends into the inner cavity of the second housing 34 and abuts on the second housing 34. Another end of the fixing sleeve 35 extends into the accommodation cavity 11 of the first housing 1. The driving assembly 3 is mounted on the first housing 1 through the fixing sleeve 35.

In this embodiment, the second housing 34 includes a top cover, side cover, and a bottom cover. One end of the fixing sleeve 35 is located in the inner cavity of the second housing 34 and abuts on the bottom cover. Another end of the fixing sleeve 35 extends into the accommodation cavity 11 of the first housing 1 and is fixedly connected to the first housing 1. The driving assembly 3 is mounted on the first housing 1 through the fixing sleeve 35.

When the plunger rod 32 moves along the height direction of the tensioning mechanism, the fixing sleeve 35 serves a function of position limiting and guiding, thereby reducing the risk of the plunger rod 32 detaching from the connecting piece 22 due to wobbling, and increasing motion stability of the plunger rod 32. In addition, the fixing sleeve 35 can protect the plunger rod 32, thereby reducing the risk of fracture of the plunger rod 32 in motion caused by an excessive length, thereby increasing the lifespan of the plunger rod 32. The driving assembly 3 is mounted on the first housing 1 through the fixing sleeve 35, thereby simplifying the connection manner between the driving assembly 3 and the first housing 1.

In any one of the foregoing embodiments, as shown in FIG. 1 to FIG. 4, the tensioning mechanism includes a second stopper 4. The second stopper 4 is mounted on the first housing 1. The second stopper 4 at least partly protrudes out of the first housing 1 so as to restrict the material from detaching from the first housing 1.

In this application, after the first housing 1 is sleeved with the material, the material can abut on the second stopper 4. The second stopper 4 can limit the motion of the material along the length direction of the first housing 1, thereby reducing safety hazards caused by the detachment of the material from the first housing 1, and further improving the safety of the tensioning mechanism.

More specifically, as shown in FIG. 4, the second stopper 4 is able to rotate around a third rotation shaft 111 against the first housing 1, so that the second stopper 4 protrudes out of the first housing 1 or retracts into the accommodation cavity 11 of the first housing 1.

In this embodiment, before the first housing 1 is sleeved with the material, the second stopper 4 is driven to rotate around the third rotation shaft 111, so that the second stopper 4 retracts into the accommodation cavity 11. After the first housing 1 is sleeved with the material, the second stopper 4 is driven to rotate around the third rotation shaft 111, so that the second stopper 4 protrudes from the first housing 1 to limit the motion of the material against the first housing 1.

Therefore, the second stopper 4 can rotate around the third rotation shaft 111, thereby facilitating the mounting and removal of the material, reducing the risk of damaging the material and the second stopper 4 during the mounting or removal of the material, increasing the lifespan of the second stopper 4, improving the production quality of the material, and improving the performance of the tensioning mechanism.

More specifically, as shown in FIG. 4, the tensioning mechanism further includes a magnetic piece 112. The magnetic piece 112 is mounted in the accommodation cavity 11. The second stopper 4 is equipped with a magnetic fit piece or the second stopper 4 is made of a metal. When the second stopper 4 at least partly protrudes out of the first housing 1, the magnetic piece 112 is able to fit the magnetic fit piece or the second stopper 4 to limit rotation of the second stopper 4 against the first housing 1.

In this embodiment, when the second stopper 4 retracts into the accommodation cavity 11, the second stopper 4 is far away from the magnetic piece 112, so that the magnetic piece 112 is out of fit with the magnetic fit piece or the second stopper 4. When the second stopper 4 protrudes from the first housing 1, the second stopper 4 is close to the magnetic piece 112, so that the magnetic piece 112 is in fit with the magnetic fit piece or the second stopper 4 to limit the rotation of the second stopper 4 against the first housing 1. When the second stopper 4 is made of a metal, no magnetic fit piece needs to be disposed on the second stopper 4. When the second stopper 4 is made of a non-metal material, a magnetic fit piece that fits the magnetic piece 112 needs to be disposed on the second stopper 4.

The magnetic piece 112 can reduce the risk that the material is detached from the first housing 1 when the second stopper 4 rotates around the third rotation shaft 111 and retracts into the accommodation cavity 11, thereby increasing the working stability of the second stopper 4.

In any one of the embodiments described above, as shown in FIG. 1 to FIG. 4, the tensioning mechanism includes a bearing 5. The bearing 5 is mounted on the first housing 1 through a mounting base 6. The bearing 5 at least partly protrudes out of the first housing 1.

In this embodiment, the bearing 5 at least partly protrudes out of the first housing 1, and can abut on the material. During the mounting or removal of the material, the bearing 5 can rotate, so that rolling friction occurs between the material and the first housing 1. The bearings 5 are plural in number, and are evenly distributed on the surface of the first housing 1. The mounting base 6 may be one or more in number. In this embodiment, the number of mounting bases 6 is three.

The bearing 5 reduces the friction between the material and the first housing 1 during the mounting and removal of the material, thereby facilitating the mounting and removal of the material and improving user experience.

More specifically, as shown in FIG. 2 and FIG. 4, along a length direction of the tensioning mechanism, the tensioning mechanism includes a first mounting block 12 and a second mounting block 13 disposed opposite to each other. Both the first mounting block 12 and the second mounting block 13 are fixedly connected to the first housing 1. The mounting base 6 is mounted on the first housing 1 through the first mounting block 12 and the second mounting block 13.

Along the length direction of the first housing 1, the first mounting block 12 and the second mounting block 13 are disposed opposite to each other in the accommodation cavity 11 of the first housing 1. A stop block 15 is fixedly mounted inside the first housing 1. Both the first mounting block 12 and the second mounting block 13 are fixedly mounted on the first housing 1 through the stop block 15. The two ends of the mounting base 6 are fixedly connected to the first mounting block 12 and the second mounting block 13 respectively. The second stopper 4, the second bearing 5, the magnetic piece 112, and the fixing base 28 are all mounted on the mounting base 6. One end of the mounting base 6, at which the second stopper 4 is mounted, is fixedly connected to the first mounting block 12 through the third mounting block 14. In addition, the tensioning mechanism further includes an end cap 7. The end cap 7 and the first housing 1 define the accommodation cavity 11. The end cap 7 is detachably connected to the first housing 1.

The mounting base 6 is fixedly connected to the first mounting block 12 through the third mounting block 14, and is fixedly connected to the first housing 1 through the first mounting block 12 and the second mounting block, thereby simplifying the connection manner between the mounting base 6 and the housing. One end of the mounting base 6, at which the second stopper 4 is mounted, is fixedly connected to the first mounting block 12 through the third mounting block 14, thereby reducing the risk that the first mounting block 12 hinders the motion of the second stopper 4, and in turn, improving the working stability of the second stopper.

The end cap 7 is detachably connected to the first housing 1, thereby simplifying the mounting, repair, and removal of parts inside the accommodation cavity 11, and in turn, increasing the lifespan of the parts inside the accommodation cavity 11.

Figure 8:
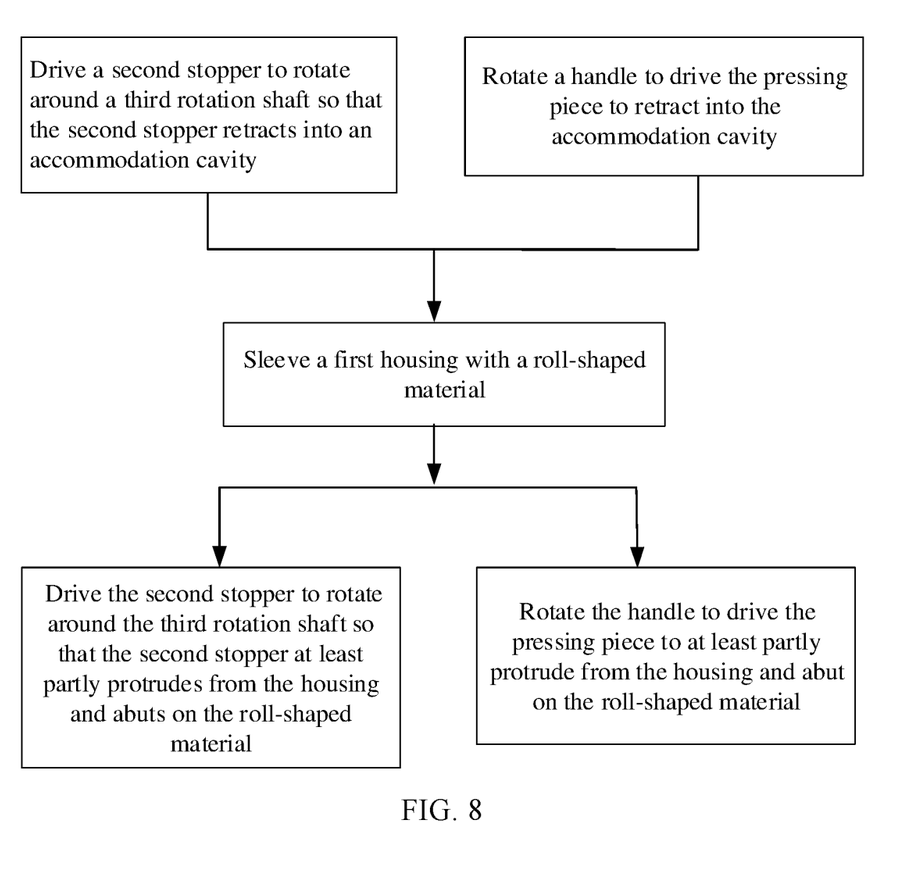
FIG. 8 is a schematic diagram of a method for using a tensioning mechanism according to this application.

An embodiment of this application further provides a method for using a tensioning mechanism. As shown in FIG. 8, the tensioning mechanism is the tensioning mechanism according to any one of the embodiments described above. The tensioning mechanism further includes a pressing piece 21, and the method for using the tensioning mechanism includes the following steps:

S2: Driving the handle 31 to rotate against the first housing 1, so that the pressing piece 21 at least partly retracts into an interior of the accommodation cavity 11;

S3: Sleeving the first housing 1 with a roll-shaped material; and

S4: Driving the handle 31 to rotate against the first housing 1, so that at least a part of the pressing piece 21 protrudes out of the first housing 1 and abuts on the material, so as to limit motion of the material against the tensioning mechanism.

In this embodiment of this application, through a handle 31, the pressing piece 21 is driven to retract into the accommodation cavity 11. After the first housing 1 is sleeved with the material, the pressing piece 21 is driven through the handle 31 to protrude from the first housing 1 and abut on the material, so that the material is tensioned by the first housing 1 and the pressing piece 21, thereby reducing the safety hazards caused by the motion of the material against the housing, increasing the firmness of the material mounted on the first housing, and improving the safety of the tensioning mechanism. When the pressing piece 21 is driven through the handle 31 to protrude from or retract into the first housing 1, no motor is required for driving, thereby reducing energy consumption and enabling the user to use the tensioning mechanism handily.

Specifically, the tensioning mechanism further includes a second stopper 4. As shown in FIG. 8, the method of using a tensioning mechanism further includes the following steps:

S1: Driving the second stopper 4 to rotate against the first housing 1, so that the second stopper 4 retracts into the accommodation cavity 11 of the first housing 1; and S5: Driving the second stopper 4 to rotate against the first housing 1, so that at least a part of the second stopper 4 protrudes from the first housing 1 to restrict the material from detaching from the first housing 1.

In this embodiment of this application, the user may perform step S1 or step S2 first depending on the usage habit, or perform step S1 and step S2 concurrently. The user may perform step S4 or step S5 first depending on the usage habit, or perform step S4 and step S5 concurrently. This embodiment of this application does not particularly limit the order between step S1 and step S2 or the order between step S4 and step S5.

The second stopper 4 is disposed to make the material abut on the second stopper 4, thereby reducing the risk of detachment of the material from the first housing 1, and further improving the safety of the tensioning mechanism.

To sum up, as shown in FIG. 1 to FIG. 8, before the first housing 1 is sleeved with the material, the second stopper 4 is driven to rotate around the third rotation shaft 111, so that the second stopper 4 retracts into the accommodation cavity 11. At the same time, the handle 31 is rotated, and the handle 31 and the cam 33 rotate around the second rotation shaft 36, so that the connecting piece 22 oscillates around the first rotation shaft 23 as driven by the plunger rod 32. That is, the second end 222 of the connecting piece 22 moves downward, and the first end 221 of the connecting piece 22 moves upward, so that the pressing piece 21 retracts into the interior of the accommodation cavity 11. At the same time, the movable piece 27 moves upward against the first fastener 26 as driven by the pressing piece 21, and the elastomer 25 is compressed and produces a resilience force. In a process of sleeving the first housing 1 with the roll-shaped material, the bearing 5 exposed out of the first housing 1 contacts the material, and rotates as driven by the material, so as to reduce the friction between the material and the first housing 1. After the first housing 1 is sleeved with the material, the handle 31 is rotated so that the handle 31 and the cam 33 rotate around the second rotation shaft 36. The plunger rod 32 moves along the height direction of the tensioning mechanism as driven by the cam 33, and drives the connecting piece 22 to rotate around the first rotation shaft 23. That is, the second end 222 of the connecting piece 22 moves upward, and the first end 221 of the connecting piece 22 moves downward, so that the pressing piece 21 at least partly protrudes from the first housing 1 and abuts on the material. At this time, the material is tensioned by the bearing 5 and the pressing piece 21 that protrude from the first housing 1. At the same time, the movable piece 27 moves downward against the first fastener 26 as driven by the pressing piece 21, and the elastomer 25 returns to the uncompressed state. The second stopper 4 is driven to rotate around the third rotation shaft 111, so that at least a part of the second stopper 4 protrudes from the first housing 1. At the same time, the magnetic piece 112 mounted on the mounting base 6 fits the magnetic fit piece mounted on the second stopper 4 or fits the second stopper 4 to prevent the second stopper 4 from retracting into the accommodation cavity 11 due to rotation around the third rotation shaft 111.

In this embodiment, the roll-shaped material is tensioned by the pressing piece 21 and the first housing 1, thereby reducing the safety problems caused by the motion of the material against the first housing 1. The second stopper 4 abuts on the material, thereby reducing the risk of detachment of the material from the first housing 1, and improving the safety of the tensioning mechanism. The cam 33, the plunger rod 32, and the connecting piece 22 drive the pressing piece 21 to retract into or protrude from the housing, thereby implementing manual operation of the tensioning mechanism, enabling the tensioning mechanism to work in a non-energized state, reducing the energy consumed by the tensioning mechanism, and in turn, improving the performance of the tensioning mechanism. The cam 33, the plunger rod 32, and the connecting piece 22 drive the pressing piece 21 to retract into or protrude from the housing, thereby simplifying the user's operation, reducing the force required to control the motion of the pressing piece 21, and in turn, improving the user experience.

The embodiments described above are merely exemplary embodiments of this application, but are not intended to limit this application. To a person skilled in the art, various modifications and variations may be made to this application. Any modifications, equivalent replacements, improvements, and the like made without departing from the spirit and principles of this application still fall within the protection scope of this application.

What is claimed is:

1. A tensioning mechanism, comprising:
 a housing, wherein the housing comprises an accommodation cavity, and the housing is configured to be sleeved with a to-be-tensioned material;

a tensioning assembly, wherein the tensioning assembly is mounted in the accommodation cavity;

a driving assembly, wherein the driving assembly is mounted on the housing, and the driving assembly is configured to drive the tensioning assembly to move against the housing, so that at least a part of the tensioning assembly protrudes from or retracts into the housing; and a bearing, wherein the bearing is mounted on the housing through a mounting base, and the bearing at least partly protrudes out of the housing;

wherein the driving assembly comprises a handle, the handle is mounted on an outer side of the housing, and the handle is configured to manually drive the tensioning assembly to move against the housing.

2. The tensioning mechanism according to claim 1, wherein:

the tensioning assembly comprises a pressing piece and a connecting piece, a first end of the connecting piece is connected to the pressing piece, and a second end of the connecting piece is connected to the driving assembly;

the driving assembly is configured to drive, through the connecting piece, the pressing piece to move against the housing; and the pressing piece is configured to, when the material is put on the tensioning mechanism, protrude from the housing by a length greater than a distance between the material and the housing.

3. The tensioning mechanism according to claim 2, wherein:

the tensioning assembly further comprises a rotation shaft located in the accommodation cavity;

the connecting piece is configured to oscillate around the rotation shaft; and the rotation shaft is located between the first end and the second end, so that the first end and the second end are configured to ascend and descend as driven by the driving assembly.

4. The tensioning mechanism according to claim 2, wherein:

the tensioning assembly further comprises a first stopper, and the first stopper is mounted in the accommodation cavity; and the first stopper is configured to limit an oscillation angle of the connecting piece.

5. The tensioning mechanism according to claim 4, wherein the first stopper is provided with a limiting hole that extends along a height direction of the tensioning mechanism, and the connecting piece extends into the limiting hole.

6. The tensioning mechanism according to claim 2, wherein the tensioning assembly further comprises an elastomer, one end of the elastomer is connected to the housing, another end of the elastomer is connected to the pressing piece, and the elastomer is configured to drive the pressing piece to reset.

7. The tensioning mechanism according to claim 6, wherein the tensioning assembly further comprises a fastener, the pressing piece is connected to a movable piece, the movable piece is at least partly located in the fastener and is configured to move against the fastener along a height direction of the tensioning mechanism, to limit a distance by which the pressing piece moves against the housing.

8. The tensioning mechanism according to claim 2, wherein the driving assembly comprises a plunger rod, one end of the plunger rod is connected to the handle, another end of the plunger rod is connected to the second end of the connecting piece, and the handle is configured to drive, through the plunger rod, the connecting piece to rotate.

9. The tensioning mechanism according to claim 8, wherein:

the handle is configured to rotate against the housing;

the driving assembly further comprises a cam, the cam is fixedly connected to the handle, and one end of the plunger rod is connected to the handle through the cam; and the handle is configured to drive the cam to rotate around a rotation shaft, to drive the plunger rod to ascend and descend against the housing.

10. The tensioning mechanism according to claim 9, wherein:

the housing is a first housing;

the driving assembly further comprises a second housing, and the handle and the cam are mounted in an inner cavity of the second housing through the rotation shaft; and a limiting portion is disposed on a sidewall of the second housing, a limiting fit portion is disposed on the handle or the cam, and the limiting portion is configured to, when the handle or the cam rotates against the second housing, abut on the limiting fit portion to limit a rotation angle of the handle and the cam.

11. The tensioning mechanism according to claim 10, wherein:

the driving assembly further comprises a fixing sleeve, and the plunger rod is at least partly located in the fixing sleeve and is configured to slide against the fixing sleeve; and one end of the fixing sleeve extends into the inner cavity of the second housing and abuts on the second housing, and another end of the fixing sleeve extends into the accommodation cavity of the first housing, and the driving assembly is mounted on the first housing through the fixing sleeve.

12. The tensioning mechanism according to claim 1, further comprising:

a second stopper, wherein the second stopper is mounted on the housing, and the second stopper at least partly protrudes out of the housing to restrict the material from detaching from the housing.

13. The tensioning mechanism according to claim 12, wherein the second stopper is configured to rotate around a rotation shaft against the housing, so that the second stopper protrudes out of the housing or retracts into the accommodation cavity of the housing.

14. The tensioning mechanism according to claim 13, further comprising:

a magnetic piece;

wherein:

the magnetic piece is mounted in the accommodation cavity;

the second stopper is made of a metal; and the magnetic piece is configured to, when the second stopper at least partly protrudes out of the housing, fit with the second stopper to limit rotation of the second stopper against the housing.

15. The tensioning mechanism according to claim 1, further comprising:

a first mounting block and a second mounting block disposed opposite to each other along a length direction of the tensioning mechanism;

wherein both the first mounting block and the second mounting block are fixedly connected to the housing, and the mounting base is mounted on the housing through the first mounting block and the second mounting block.

16. A method for using a tensioning mechanism, the tensioning mechanism comprising:
- a housing, wherein the housing comprises an accommodation cavity, and the housing is configured to be sleeved with a to-be-tensioned material;
- a tensioning assembly, wherein the tensioning assembly is mounted in the accommodation cavity;
- a driving assembly, wherein the driving assembly is mounted on the housing, the driving assembly is configured to drive the tensioning assembly to move against the housing, so that at least a part of the tensioning assembly protrudes from or retracts into the housing, and the driving assembly comprises a handle mounted on an outer side of the housing and configured to manually drive the tensioning assembly to move against the housing;
- a bearing, wherein the bearing is mounted on the housing through a mounting base, and the bearing at least partly protrudes out of the housing; and
- a pressing piece;

the method comprising:
- driving the handle to rotate against the housing, so that the pressing piece at least partly retracts into an interior of the accommodation cavity;
- sleeving the housing with the material, the material being a roll-shaped material; and
- driving the handle to rotate against the housing, so that at least a part of the pressing piece protrudes out of the housing and abuts on the material, to limit motion of the material against the tensioning mechanism.

17. The method according to claim 16, further comprising:
- driving a second stopper of the tensioning mechanism to rotate against the housing, so that the second stopper retracts into the accommodation cavity of the housing; and
- driving the second stopper to rotate against the housing, so that at least a part of the second stopper protrudes from the housing to restrict the material from detaching from the housing.

* * * * *